United States Patent [19]
Puccini

[11] 3,760,105

[45] Sept. 18, 1973

[54] TRAFFIC MONITOR FOR DATA PROCESSING SYSTEM

[75] Inventor: Sergio E. Puccini, Wooddale, Ill.

[73] Assignee: GTE Automatic Electric Laboratories Incorporated, Northlake, Ill.

[22] Filed: May 1, 1972

[21] Appl. No.: 249,282

[52] U.S. Cl. .............................. 179/8 A, 340/172.5

[51] Int. Cl. .......................................... H04m 15/26

[58] Field of Search ............ 179/8 A, 18 EB, 18 ES, 179/8 R, 7 R, 15 BF, 175.2 C; 340/172.5

[56] References Cited

UNITED STATES PATENTS

| | | | |
|---|---|---|---|
| 2,909,608 | 10/1959 | Callaway et al. | 179/8 A |
| 3,532,827 | 10/1970 | Ewin | 179/18 ES |
| 3,601,546 | 8/1971 | Lee | 179/18 EB |

*Primary Examiner*—Kathleen H. Claffy
*Assistant Examiner*—Kenneth D. Baugh
*Attorney*—K. Mullerheim et al.

[57] ABSTRACT

In the register-sender subsystem of a telephone switching system, the traffic monitor for determining the number of busy registers in order to distinguish periods of heavy traffic from light traffic comprises a counter, and comparison circuits, with a set of thumbwheel switches in a control center for setting a predetermined number, the comparison circuits being arranged to indicate when the number of busy registers is equal to or exceeds the setting on the thumbwheel switches. The register-sender is of the time-division multiplex type having common logic circuits and a memory which stores information relating to a state of a call, including processing sequence state information which indicates various states including an idle state. The registers have access to the memory and common logic circuits during sequential time slots, and during each time slot when the information for a register is read from memory, the processing sequence state indication is supplied to the counter so as to advance the counter if the register is busy. The settings on the thumbwheel switches include a cut-in level and a cut-out level, and separate comparison circuits are used for comparing the settings against the same counter. There are separate counters and comparison circuits as well as sets of thumbwheel switches for incoming registers and local registers.

8 Claims, 10 Drawing Figures

TRAFFIC MONITOR FOR DATA PROCESSING SYSTEM

BACKGROUND OF THE INVENTION

1. Field of the Invention

This invention relates to a monitor for determining when the number of units in a pool of units for a data processing system exceeds a predetermined value, and more particularly relates to a traffic monitor for registers in a communication switching system.

2. Description of the Prior Art

In common control communication switching systems, registers are provided in a common pool for receiving dialed digits from calling lines. It is normal practice to provide a time-out arrangement to release a register if too much time is consumed before or during dialing, and for other operations. During periods of heavy traffic it is desirable to provide an arrangement for faster time-out so as to reduce the probability of delays in connecting an originating call to a register because of an all register busy condition. One arrangement known in the prior art for monitoring the traffic in the pool registers is to provide a common supervisory unit which includes a polar relay having one winding connected in multiple to a monitoring terminal in all of the registers, with each register having a resistor which is connected between its monitoring terminal and ground when it is in use; and another winding of the relay being connected to a resistance which may be adjustable, so that the relay operates when a predetermined number of registers are busy. While this arrangement is satisfactory for small groups of registers, it does have disadvanages particularly for very large groups of registers.

SUMMARY OF THE INVENTION

The object of this invention is to provide a traffic monitor which is satisfactory for large groups of registers, in which the predetermined values for the cut-in levels and cut-out levels and the difference between them is readily variable, and which is flexible in use.

The invention is incorporated in a time-division multiplex register subsystem having common logic circuits, a memory, and peripheral units designated as register junctors each register having an individual block of storage in the memory and an individual register junctor. Each register has an individual time slot during which its register junctor is effectively connected to the common logic circuit, and the information in its memory block is read, processed by the common logic circuit, and rewritten. During each multiplex cycle the time slots of all of the registers occur in sequential order. The information stored in the memory for each register includes a processing sequence state, which includes an indication of the busy-idle status.

According to the invention a traffic monitor comprises a counter, a device such as a set of manual switches for setting a predetermined number, and comparison apparatus. The outputs of the read buffer and the common logic circuits for the processing sequence state are connected to the counter so as to advance the counter during each time slot in response to a given status condition, (the busy condition in the preferred embodiment). The comparison apparatus compares the number registered in the counter and the predetermined number from the device to produce an output when they are equal and set a bistable device.

In the preferred embodiment of the invention, separate comparison circuits are used for cut-in levels and cut-out levels, and separate predetermined numbers set into the devices such as manual switches. Specifically the arrangement is such that if in a multiplex cycle the cut-in level for busy registers is reached, fast timing is provided in successive cycles, until a cycle in which the cut-out level of busy registers is not reached (cut-out is normally lower than cut-in level).

Further according to the invention, the registers may be divided into two categories such as incoming and local register junctors, each having its own counter and comparison circuits for cut-in and cut-out levels, and in each time slot the fast or slow timing is used depending on the type of register.

CROSS REFERENCES TO RELATED APPLICATIONS

This invention is incorporated in the system disclosed in a DATA PROCESSOR WITH CYCLIC SEQUENTIAL ACCESS TO MULTIPLEXED LOGIC AND MEMORY, U.S. Pat. application Ser. No. 201,851 filed Nov. 24, 1971 by myself, hereinafter referred to as the REGISTER-SENDER patent application.

DESCRIPTION OF THE PREFERRED EMBODIMENT

Figure 1:
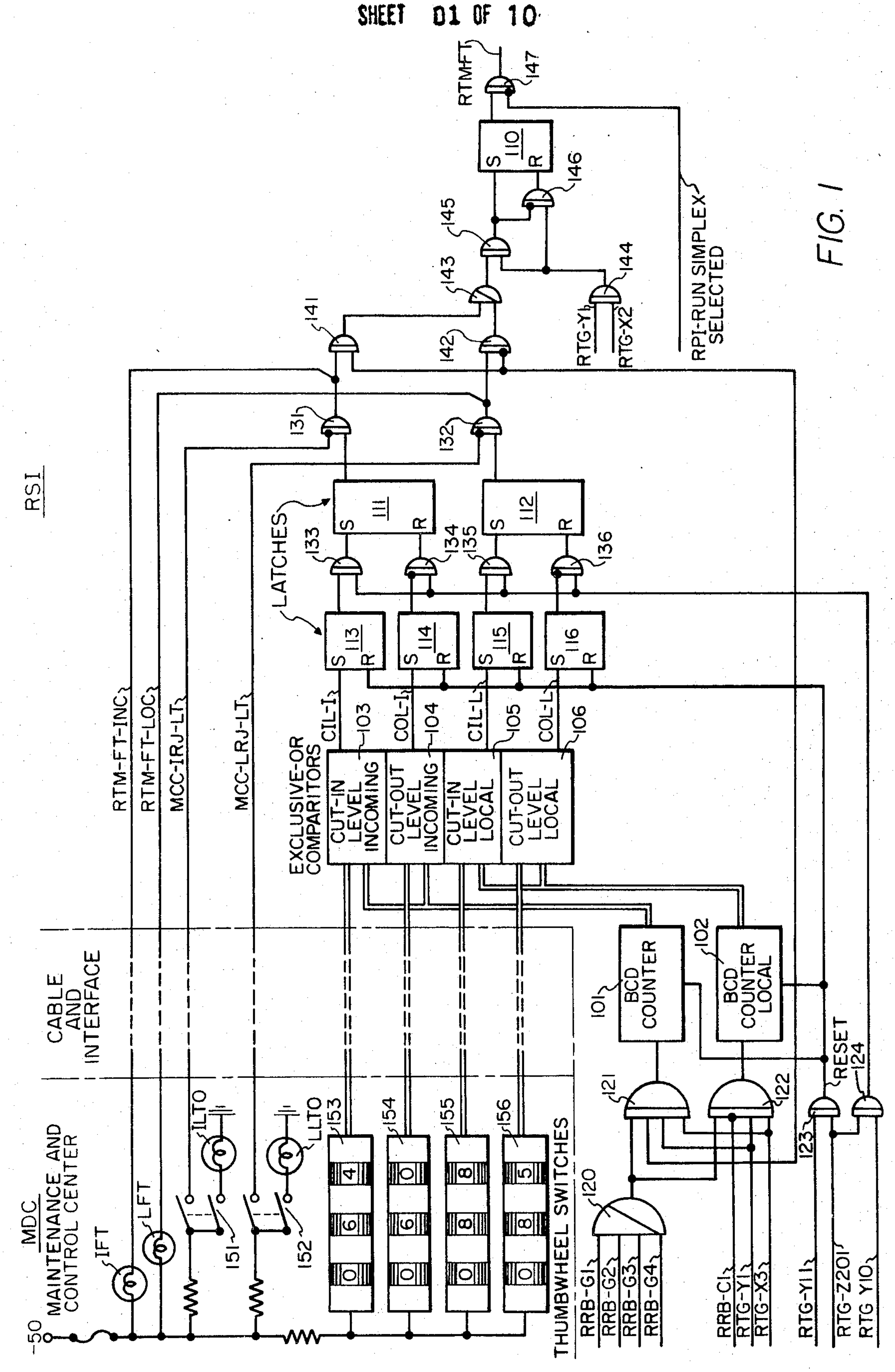
FIG. 1 is a functional block diagram of the traffic monitor, and a portion of the maintenance and control center.

The traffic monitor, shown in FIG. 1, comprises counters 101 and 102 for counting the number of busy incoming and local register junctors respectively, and comparison circuits 103–106. The maintenance and control center MDC includes thumb wheel switches for setting the cut-in and cut-out levels for incoming and local register junctors respectively, for use by the comparison circuits. These circuits are described more fully below.

Figure 2:
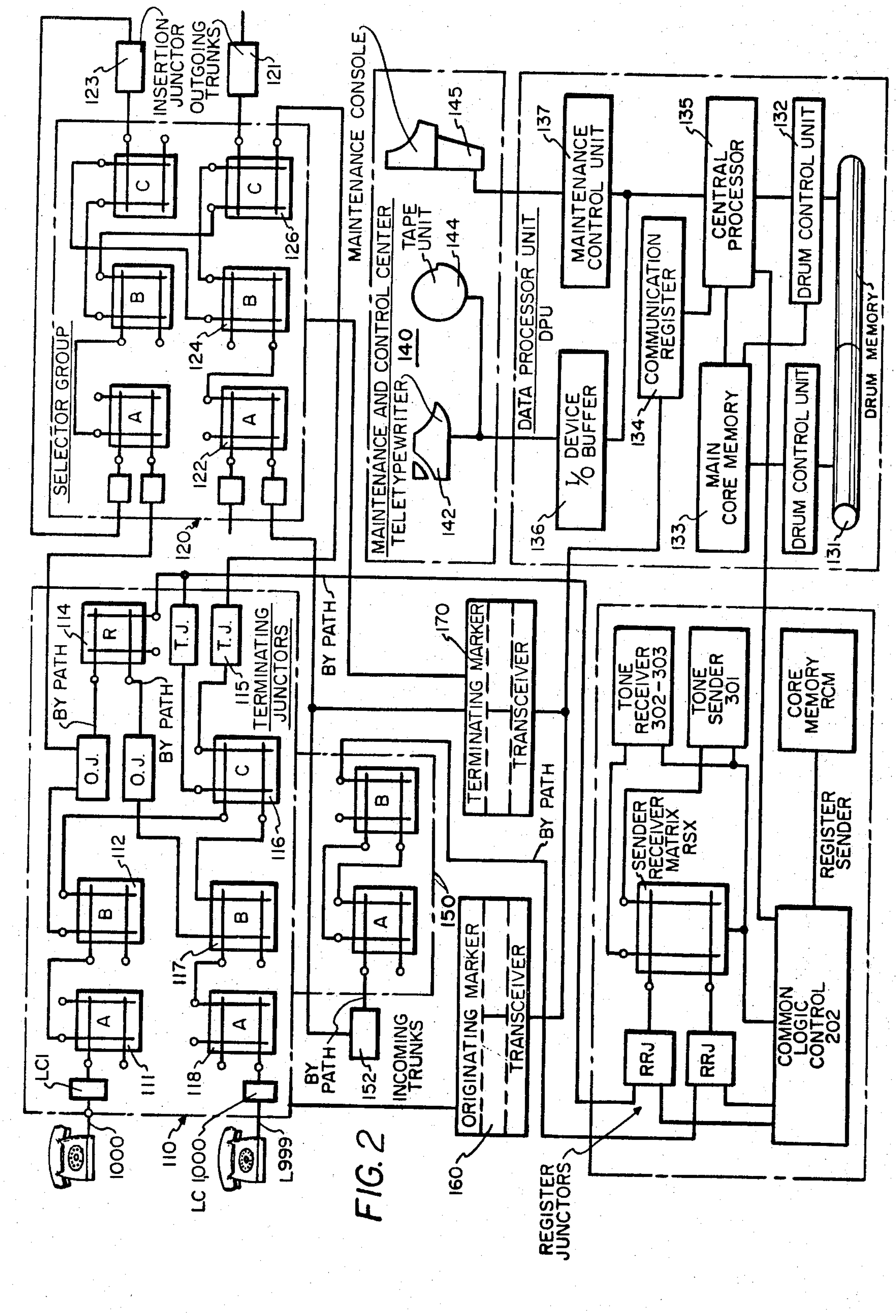
FIG. 2 is a block diagram of a communiction switching system incorporating the preferred embodiment of the invention.
Figure 6:
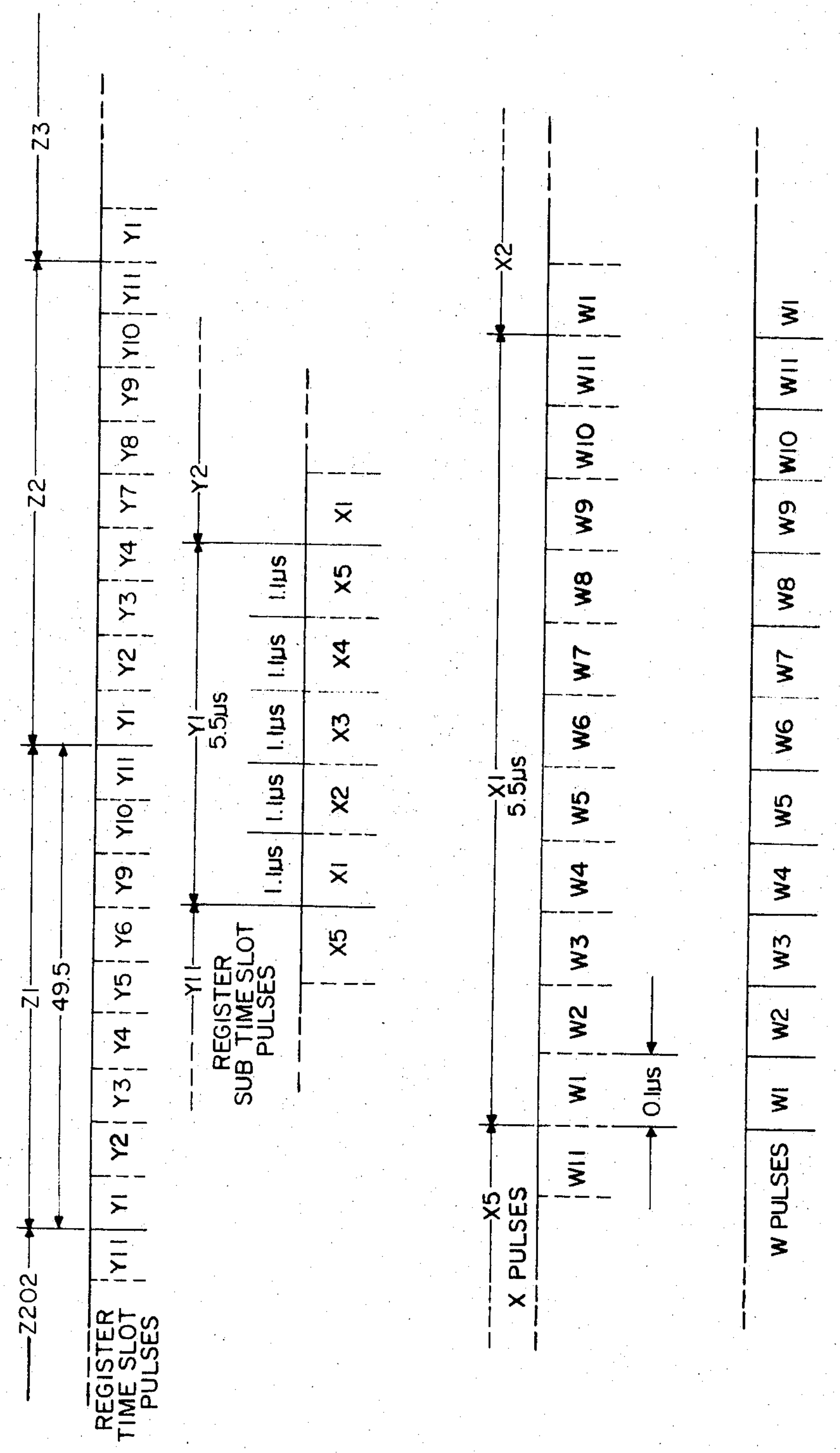
FIG. 6 is a timing chart for the register timing generator.

The traffic monitor is incorporated in a register-sender subsystem of a telephone switching system as shown in FIG. 2. The register-sender subsystem RS includes common logic circuits 202 which are shared on a time division multiplex basis by a plurality of register junctors RRJ. The register jucntors serve as peripheral units to receive incoming data information in the form of dialed digits, and output information in the form of certain digital control signals and digits for outpulsing to other offices. The register-sender subsystem includes a core memory RCM which has 16 word stores individually assigned to each register junctor. Timing control signals as represented by graphs in FIG. 6 are supplied from a timing generator in repetitive cycles, with each register junctor having one time slot per cycle, the time slot signals being designated by a prefix Z followed by the junctor number. The time slots are divided into sub-time slots designated by a Y prefix; there being eleven sub-time slot signals designated Y1–Y11. The memory access arrangement is such that two words are read during the sub-time slot, the information is processed by the common logic circuits, and then these two words are rewritten. The combination of two word stores of memory which are accessed during the sub-time slots are designated herein as a row of memory. The area of memory comprising eight rows (16 words) individually assigned to one register junctor is referred to as a block of memory.

Figure 7:
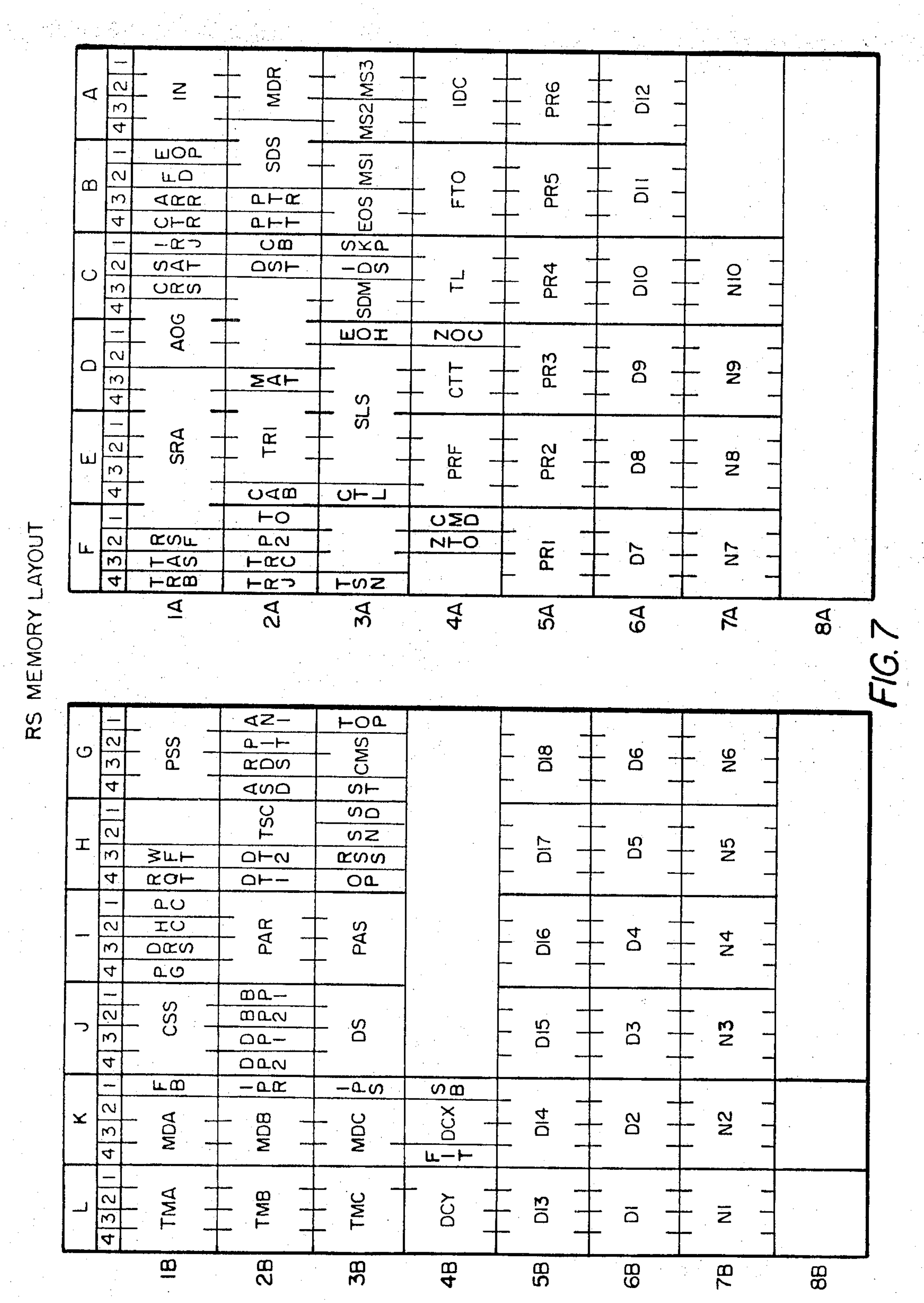
FIG. 7 is a layout diagram of the storage area in memory for one register.

The memory layout for one block is shown in FIG. 7. Each word store of the memory comprises 26 cores of which 24 are used for bits of call information. As shown in FIG. 7 the two word stores for each row are designated A on the right and B on the left respectively and each is divided into six positions of four bits each, the positions being designated A-F in word A and G-L in word B, with the bits numbered 1–4 in each position. Row 1 is used for process control information, Row 2 for register control information, Row 3 for sending control information, Row 4 for translation control and miscellaneous information, Rows 5 and 6 for prefix and called number digits, Row 7 for calling number digits, and Row 8 is a spare.

The scan organization provides for scanning the register junctors in sequence during their respective time slots Z, and during each time slot the first three rows are control rows which are accessed twice, Row 1 being accessed during sub-time slots Y1 and Y9, Row 2 during sub-time slots Y2 and Y10, and Row 3 during sub-time slots Y3 and Y11. Row 4 is accessed during sub-time slot Y4. The other rows in like manner are accessed during their respective sub-time slots Y5–Y8, but there are different modes of scanning which permit certain rows to be skipped depending on the mode.

GENERAL SYSTEM DESCRIPTION

The telephone switching system is shown in FIG. 2. The system is described in said REGISTER-SENDER patent application. Briefly it comprises a switching portion comprising a plurality of line groups such as line group 110, a plurality of selector groups such as selector group 120, a plurality of trunk-register groups such as group 150, a plurality of originating markers such as marker 160, and a plurality of terminating markers such as marker 170; and a control portion which includes register-sender group such as RS, a data processing unit DPU, and a maintenance control center 140.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to the common logic, or may be received in dial pulse modes directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system and provide a pool of registers for storing call processing information received via the register junctors RRJ. The information is stored in the core memory RCM on a time division multiplex sequential access basis, and the memory RCM can be accessed by other subsystems such as the data processor unit 130 on a random access basis.

The data procsssor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A central processor 135 accesses the register-sender RS and communicates with the main core memory 133 to provide the computer control for processing the calls through the system.

TYPICAL CALLS

When a telephone station goes off-hook, the originating marker responds to identify the calling line. A path is selected from the calling line circuit via the A and B matrices and an originating junctor OJ, and thence via an R matrix to a register junctor RRJ. The originating marker also sends the calling line identity to the data processing unit via communication register 134. The data processor analyzes the calling line information and supplies the register junctor identity to the register-sender subsytem to complete and hold the connection. Dial tone is supplied via the register junctor and the network to the calling line, following which dialed digits are received via the register junctor and stored in its block of the core memory RCM, making use of the common logic circuits 202. The register-sender subsystem generates an interrupt to the data processing unit DPU to obtain a translation. A terminating path is selected and information is supplied via the communication register 134 to the terminating marker to complete the terminating portion of the path through the selector group, and if it is local terminating through the line group. For an outgoing call a trunk is selected and appropriate digits for outpulsing are supplied into the block of memory of the register junctor.

REGISTER-SENDER SUBSYSTEM

Figure 3:
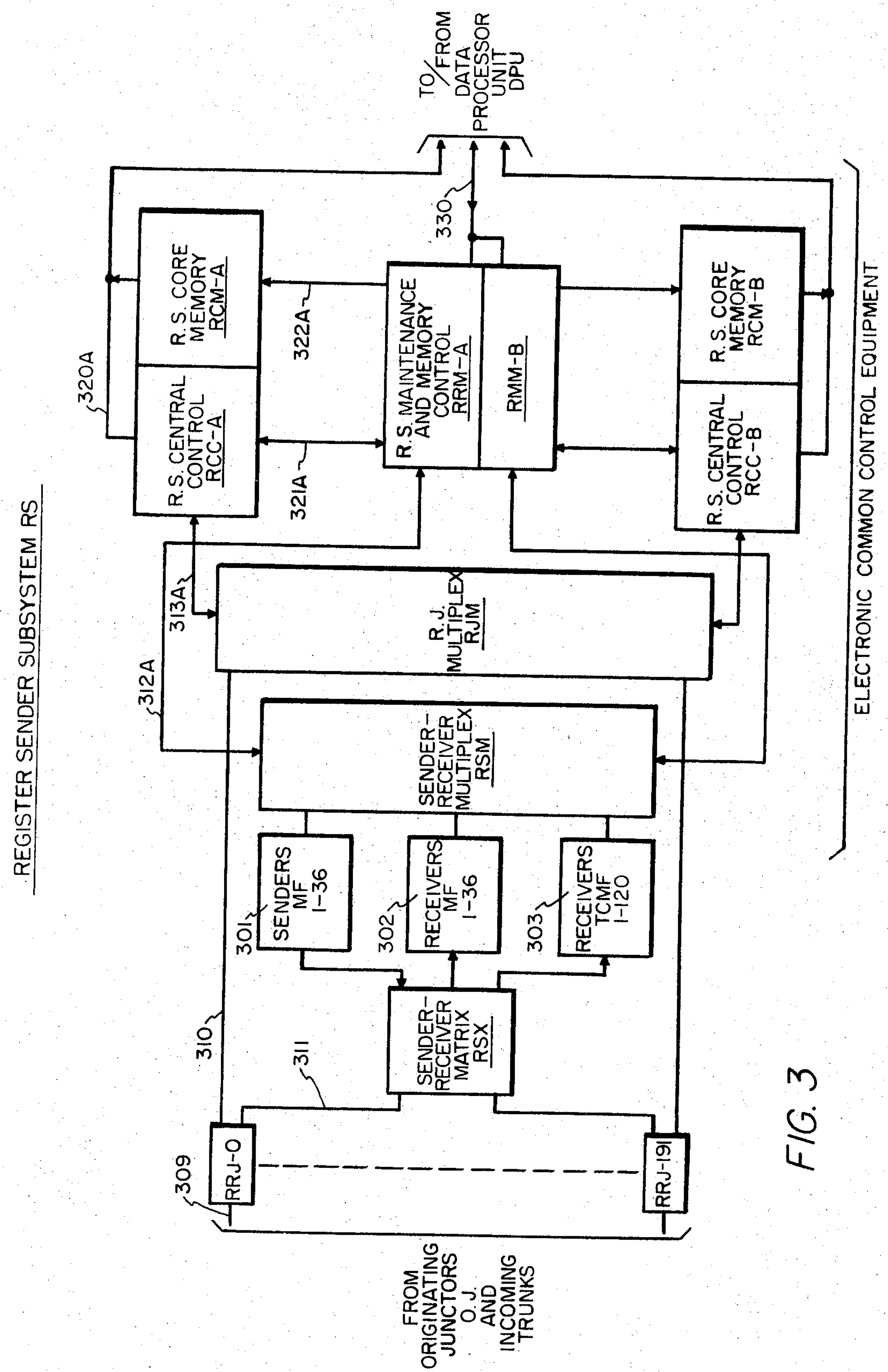
FIG. 3 is a block diagram of the register-sender subsystem.

Referring to FIGS. 2 and 3, the register-sender RS is a time-shared common control unit with the ability to register and process 192 calls simultaneously from local lines or incoming trunks. The register-sender RS provides the electronic time-shared register apparatus for receiving and storing incoming digits, and pulse generating sender circuitry to forward a call toward its destination. In this regard, the register-sender RS generally includes a plurality of register junctors RRJ0–RRJ191 which are space-divided electromechanical access circuits for providing an interface between the switching matrices of the system and the time-shared register apparatus, which includes the electronic logic of a common logic control 202, a ferrite-core memory RCM to store digits to be received and sent via the register junctors RRJ, and supervisory information pertaining to the call under the control of the common logic control 202. A sender-receiver matrix RSX selectively connects a plurality of tone receivers and senders 301–303 to the register junctors RRJ for signaling modes other than the dial pulse mode which is provided for by the register junctors RRJ.

The time-shared common logic control 202 of the register sender is duplicated and runs identical operations in synchronism with one another. Under normal conditions, both sets of time-shared equipment are partially active, one set serving one-half of the register junctors RRJ and the other set serving the remaining half of the register junctors RRJ. In case of equipment faults, either set of time-shared equipment can serve all of the register junctors RRJ.

The space-divided equipment of the register-sender includes the register junctors RRJ, the senders and receivers, and the sender-receiver matrix RSX. The register junctors RRJ with their associated multiplex equipment RJM provide an interface between the space-divided matrix outlets connected to the register junctors RRJ and the time-shared common logic control 202. The sender-receiver matrix RSX provides a metallic path from the register junctors RRJ to the tone senders and receivers under the control of the common logic control 202. The senders 301 provide for sending in the multifrequency mode, and the receivers provide for receiving in either the touch-calling multifrequency mode from the local lines or the multifrequency mode from the incoming trunks 152.

The register junctors RRJ are the entry and exit point of the register-sender for information transferred between the switching network and the register-sender. The register junctors enable the register sender to provide the following features: dial pulse receiving and sending, coin and party testing, line busy, dial tone, and reorder tone application. The incoming and outgoing matrix paths are held by the register junctors RRJ during call processing. The register junctors comprise electromechanical components for compatibility with lines, trunks, and switching network circuits, however they also include electronic interfacing circuits which are similar to those in the markers for compatibility with the electronic common logic control 202. Signals from lines, trunks, and network circuits are received by the register junctors and forwarded to the common logic control for processing.

The common logic control 202 contains the control logic for call processing by the register-sender 200. The purpose of the common logic control 202 is to perform all functions associated with receiving, sending, and timing of digits, and to control processing of calls by generating commands for other circuits in the register-sender and for the switching network. Since the common logic control 202 operates on a time-shared basis to store call processing information in the memory RCM, the common logic control 202 has the ability to register and process 192 simultaneous calls. The common logic control works closely with the core memory RCM which together form the register apparatus, and which provides storage of information concerning the calls in progress and information relating to the data processor unit 130.

The core memory RCM is a conventional ferrite core memory, which need not be disclosed in detail. The memory RCM automatically restores the information in the same cores after a read operation, and it likewise automatically clears the information from the cores immediately prior to writing information into them. It is to be understood that the memory RCM could also be any suitable type of non-destructive read-out memory.

The common logic control 202 of FIG. 2 includes duplicated pairs of electronic logic units. As shown in FIG. 3 the common logic comprises a duplicated pair of central control units RCC-A and RCC-B, duplicated core memories RCM-A and RCM-B, and a maintenance and memory control which comprises a duplicated pair of units RMM-A and RMM-B. The units are provided in duplicate for reliability purposes, and each of the duplicated units functions independently as described hereinafter in greater detail. The central control units are connected to the register junctors via an RJ multiplex unit RJM, and the senders and receivers 301–303 are connected to the maintenance and memory control unit via sender-receiver multiplex unit RSM. The central control unit RCC-A along with core memory RCM-A comprises one frame of equipment, and similarly the units RCC-B and RCM-B are another frame of equipment, while the maintenance memory control units RMM-A and RMM-B together comprise a frame. The multiplex units each comprise several frames of equipment. The different frames are interconnected via cables which together with driver and receiver circuits terminating them form DC links between the frames.

Figure 4:
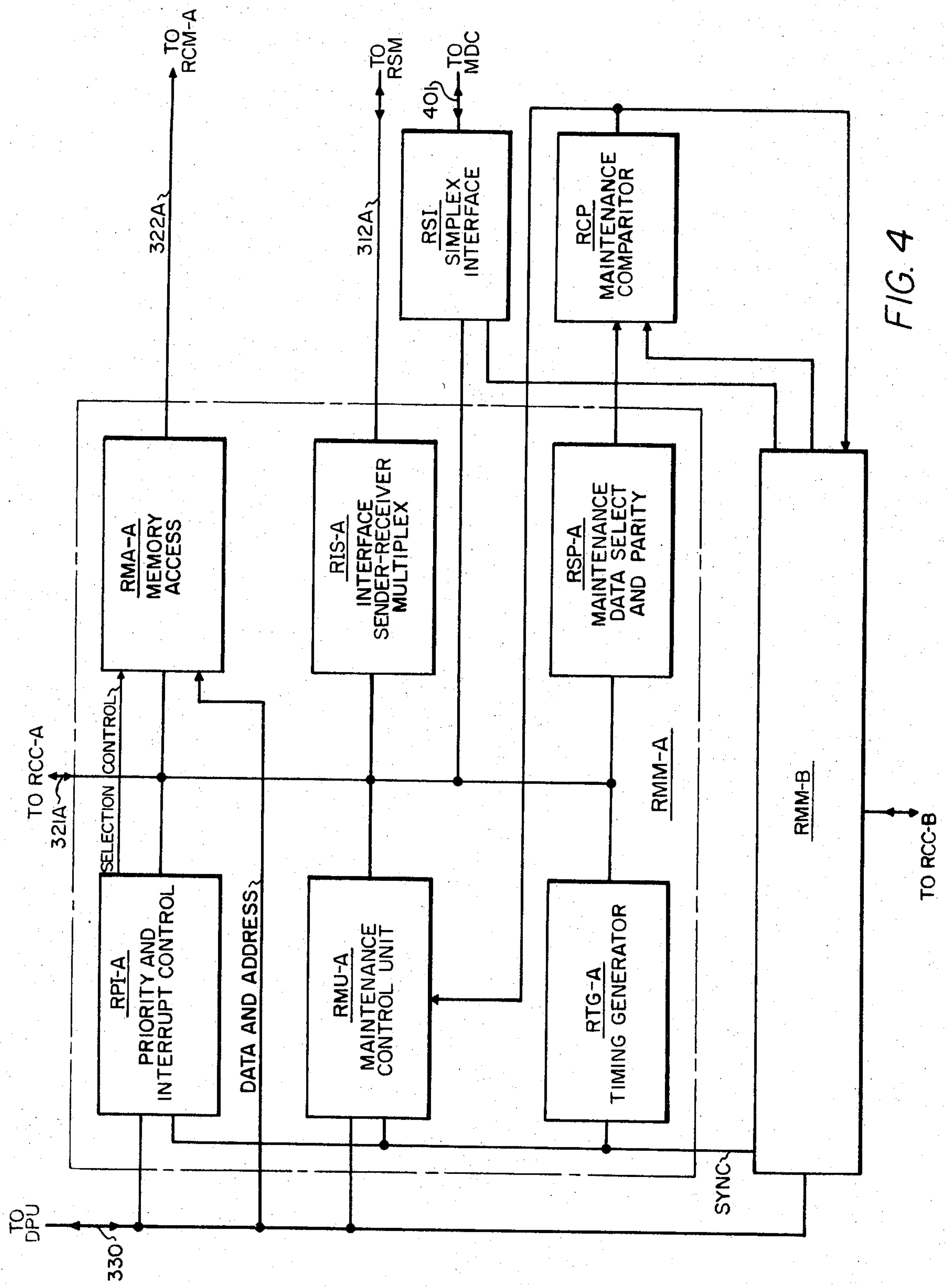
FIGS. 4 and 5 are more detailed block diagrams of portions of the register-sender subsystem.

As shown in the block diagram of FIG. 4, the RMM frame comprises some maintenance circuits and some of the commom logic circuits for call processing. The maintenance circuits consist of a maintenance control unit RMU, a maintenance data selector and parity generator RSP, and a maintenance comparator RCP. The purpose of the maintenance circuits is to supervise overall operation of the common logic circuits of the register-sender subsystem and to accomplish certain maintenance routines under hardward control and direction of the data processing unit.

The maintenance control unit RMU controls the overall operation of maintenance functions with one of the common logic units and is therefore duplexed, comprising unit RMU-A for operation with the common logic A units, and a corresponding unit as part of RRM-B.

The duplexed maintenance data selector and parity circuits RSP-A and the corresponding unit in block RMM-B has several functions. It selects which data is to be compared during the cycle and gates it to comparison gates, and gates maintenance signals that have to be stored in memory. The unit RSP also generates parity for data and address information going to memory.

The maintenance comparator RCP is a simplex unit which compares the data sent to it from the duplicated RSP units.

The main purpose of the simplex interface circuit RSI is to provide interface between the register-sender subsystem and a maintenance unit MCC not shown. In addition to this interface purpose, the circuit also includes the traffic monitor of FIG. 1 which controls the selection of timing signals depending upon the number of register junctors which are busy, for fast or slow time out.

The register timing generator comprising unit RTG-A and a corresponding unit in block RMM-B supplies timing pulses for the multiplex operation of the register-sender subsystem.

The unit RIS-A and a corresponding unit in block RMM-B operate with the sender receiver multiplex circuit RSM to provide the multiplex functions between the common logic and the senders and receivers.

The memory access circuit RMA-A and the corresponding duplex unit in block RMM-B provides the access to core memory on a multiplex basis. It provides data multiplex, address multiplex and command multiplex (start read/start write). Output to the register core memory RCM is on a data bus, address bus and command bus shown as cable 322A. Multiplex commands are controlled by the RPI circuit.

The duplexed priority interrupt circuit RPI-A and the corresponding unit in block RMM-B has the basic control of memory during all operations except maintenance. On a priority basis it determines which source of data and address will be allowed to access memory, generates the read and write commands for call processing, controls writing hardware programs, and provides cross write controls and controls interrupts sent to the data processing unit. All of these functions are duplexed and checked by the maintenance circuits.

Figure 5:
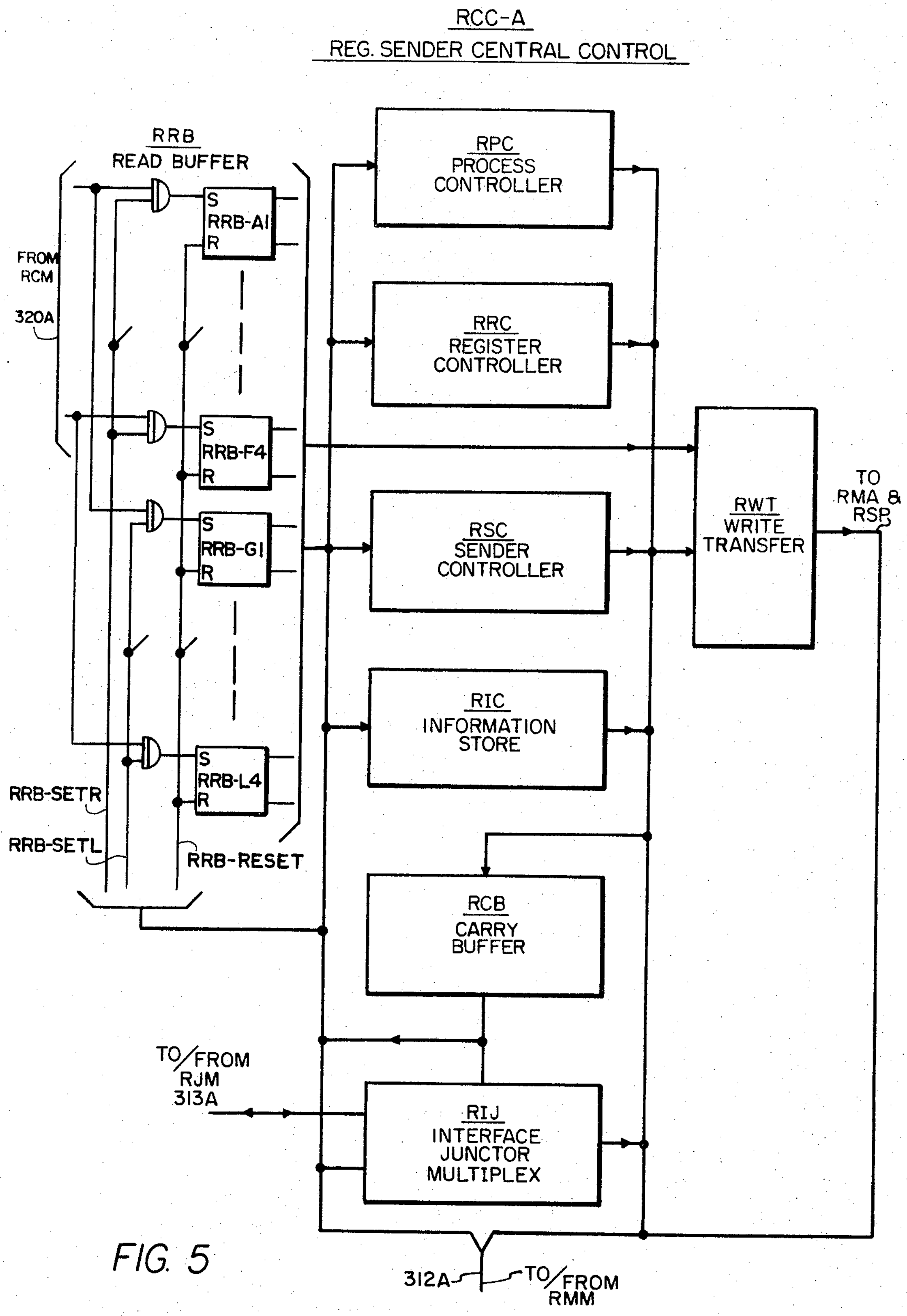

The circuits of the frame RCC-A are shown in the block diagram of FIG. 5.

The read buffer RRB is a 52-bit register. This circuit is used for temporary storage of two words from a row of the register core memory. The registers are latch circuits that make the data available to the controller circuits, the carry buffer circuits, and the write transfer circuits. The latches correspond to the positions of memory, and are designated RRB-A1 through RRB-L4.

The write transfer circuit RWT comprises 48 bit selective input devices. There are eight pairs of inputs and a clear memory circuit used to present data to the memory access circuits RMA. The write transfer circuits RWT can have as its source the different controllers shown in FIG. 5, the read buffer, and for clear memory the carry buffer RCB. The outputs from the write transfer circuit RWT are multiplex with other sources by circuit RMA for writing into the core memories RCM.

The process controller RPC is used to control the process of a call. This unit takes information from the first row of a core memory block and information from the register junctors via the multiplex circuit RJM and RIJ. The controller RPC furnishes much of its data to the carry buffer RCB for controlling other memory work operations. Changes of this processing information are restored to the memory during sub-time slot Y9. The RPC processor also generates the call processing interrupts to the data processing unit.

The register controller RRC is sued to manipulate register junctor information, primarily for call origination functions. This unit takes its information from row two of the memory or from the carry buffer RCB. The processor RRC controls the dial tone application, party testing, digit reception, and start dial signal controls. The results of the data from the RRC processor are used for manipulation in other controllers via the carry buffer RCB, for origination identification from the register junctors via the multiplex circuits RJM, via the multiplex circuits for digit reception, or is written back into memory for storage and later use.

The sender controller RSC is used to manipulate register junctor information primarily for call termination and sending functions. The processor RSC deals with information found in row 3 of the memory. This controller contains information as to start dial signals, method of digit sending, the digit being sent and the pulse count that has been sent of pulse digit; and the sequence of digit sending as to prefix digits, called number and calling number information.

The information storage controller RIC is used for data manipulation in rows 4, 5, 6, 7 and possibly 8 of the memory. The information that is handled consists of digit loading, shifting, retrieval and pattern recognition to and from appropriate places in core memory. Further data is used to set up special actions when particular conditions are recognized.

The carry buffer RCB is a series of latch circuits. There are 60 carry buffer latches. The majority of these latches are used to transfer bits of information from one call processing controller to another controller during different sub-time slots of a time slot period. The normal carry buffer information is not carried over from one time slot to another with exception of the BY latch, while indicates that a sender or receiver connection is in progress and prevents any other from attempting a connection until completion of the first.

The interface junctor multiplex unit RIJ operates with the junctor multiplex circuits RJM of FIG. 3 for multiplex to and from the register junctors.

REGISTER TIMING GENERATOR

The register timing generator RTG is shown by a functional block diagram in FIG. 6 of the REGISTER-SENDER patent application.

A 10-megahertz system clock SC is sued for the register-sender subsystem as the source for timing pulses.

A W generator is an 11-flip-flop ring counter, having respective outputs W1 through W11. The W generator uses the 10-megahertz clock SC for its source. Each output pulse from the W generator has a duration of 100 nanoseconds and a cycle rate of 1.1 microseconds.

An X generator is a 5-flip-flop ring counter, having respective outputs X1 through X5. The X generator uses the signal on lead W11 as its source. Each output pulse has a duration of 1.1 microseconds with a cycle rate of 5.5 microseconds.

A Y generator comprises 3-flip-flops YA, YB and YC, and a separate count modification flip-flop YCM. The Y generator can operate in three count modes. Mode A allows decodes of signals on output leads Y1 through Y6 and Y9 through Y11, mode B permits decodes on output leads Y1 through Y4 and then Y7 through Y11, and mode C provides decoder outputs on Y1 through Y11. The drive circuit for the Y generator is derived from the signals on leads X5 and W11. The mode of the Y counter is determined by the common logic and maintenance unit circuits. The direct outputs of the flip-flops YA, YB and YC provide signals on the memory address leads MA1, MA2 and MA3 respectively.

A Z generator is an 8-flip-flop binary counter with 3-flip-flops as ZA, 3-flip-flops as ZC, and 2-flip-flops as ZC. These flip-flops have respective outputs connected to memory address leads. The outputs from ZA are decoded as signals on leads ZA0 through ZA7, those from ZB on the outputs ZB0 through ZB7, and those from ZC on leads ZC0, ZC1 and ZC2. The Z counter is advanced by the output of an AND gate having inputs on leads Y11, X5 and W11. There are 202 steps of the Z generator 0 through 201, and the cycle time is basically 10 milli-seconds.

The timing generator RTG also includes several latches for supplying set and reset control signals to other latches of the common logic and multiplex circuits.

The timing generator also includes a 100 millisecond timer ITT and a one second timer LTT. The timer ITT is a 4-flip-flop binary counter, clocked by the decode of output 201 from the Z generator and upon reaching a binary count of 10 is reset. The one second timer LTT is a 4-flip-flop binary counter which is clocked by the decode of output 10 from the 100 millisecond timer and upon reaching a count of 10, resets itself.

The timing relationship of the outputs of the register timing generator are shown in graphical form in FIG. 6. The timing can be summarized as follows:

a. A 10-millisecond system cycle time;

b. The overall cycle (10ms) divided into 202 time slot pulses Z000–Z201 (49.5 microseconds each), 192 of which are used for call processing and 10 of which are reserved for maintenance purposes;

c. Each time slot pulse divided into 11 sub-time slot pulses Y1-Y11 (5.5 microseconds each), 9 of which are utilized during each time slot pulse of normal call processing, depending on the mode;

d. Each sub-time slot pulse divided into 55 pulses (0.1 microseconds each) comprising five pulses X1–X5 of 1.1 microseconds each, each divided into 1 W pulses W1-W11 of 0.1 microseconds each. The 55 combinations of X and W timing pulses can be utilized for accessing the memory and different logic circuits during various different times of a single subtime slot.

Note that the memory address comprises 12 bits of which bits MA4–MA11 designate the Z time slot corresponding to a particular register junctor, bits MA1, MA2 and MA3 designate a particular row of memory of the eight rows assigned to a register junctor and the right or left hand word store of a row is determined by a bit MA0 which is obtained from a flip-flop in the register priority and interrupt circuit RPI. Note from the sub-time slot decoding arrangement that sub-time slots Y9, Y10 and Y11 have the same memory addresses respectively as sub-time slots Y1, Y2 and Y3; and that the decoded outputs are differentiated by the fact that flip-flop YCM is in the set condition for sub-time slots Y9, Y10 and Y11. The binary designation in the decoding block shows the least significant bit MA1 on the right, and the state of YCM on the left.

MEMORY LAYOUT AND RELATED OPERATION OF THE COMMON LOGIC CIRCUITS

A detailed description of the memory layout and the function of the various fields thereof is found in section D of said REGISTER-SENDER patent application. Boolean equations describing the circuits of the controllers of FIG. 5 interworking with the memory are given in section K of that application, and an operational description is given in section L thereof.

Referring to FIG. 7, of particular interest to the present invention are the three timers in Rows 1, 2 and 3, bits K2-4 and L1-4; the processing sequence states in bits G1-4 of Row 1, and various time-out and trouble indicating bits in Rows 1, 2 and 3.

Timer A for the processing controller comprises fields TMA and MDA in Row 1, timer B for the register controller comprises fields TMB and MDB in Row 2, and Timer C for the sender controller comprises fields TMC and MDC in Row 3. For each of these timers there are common logic circuits comprising a binary adder and input control circuits to advance the counter once each cycle which is every 10-milliseconds, or in response to the signal ITT which occurs for one complete cycle every 100 milliseconds, or in response to the signal LTT which occurs for one complete cycle once every second. The equations are found in section K of the REGISTER-SENDER application. Resetting of one of the counters comprises setting it to the state in which the decoded value in the TMA, TMB, or TMC field is equal to 1 and the MDA, MDB or MDC field is equal to 0. Thus the TM portion of the field has a count from 1 to 15, and the MD portion has a count from 1 to 7. Generally the MD portion is advanced each time the TM portion steps from 15 back to 1. The 0 value for the TM field occurs only when the entire memory is cleared. The mode for stepping the three timers differs since the timing ranges for the three controllers differ.

Timer A for decoded mode values MDA=0 and MDA=1 is advanced every 10 milliseconds providing a range from 10 to 300 milliseconds; for decoded mode values MDA=2 and MDA=3 is advanced every 100 milliseconds providing a range from 100 to 3,000 milliseconds; and for decoded mode values MDA=4 through 7 is advanced every second providing a range from 1 to 60 seconds.

Timer B for mode values MDB=0 and MDB=1 is advanced every 10 milliseconds providing a range from 10 to 300 milliseconds; and for mode values MDB=2 through MDB=7 is advanced every second providing a range from 1 to 90 seconds.

Timer C for mode values MDC=0 through MDC=4 is advanced every 10 milliseconds providing a range from 10 to 750 milliseconds, and for mode values MDC=5 through MDC=7 is advanced every second providing a range from 1 to 45 seconds.

Figure 8:
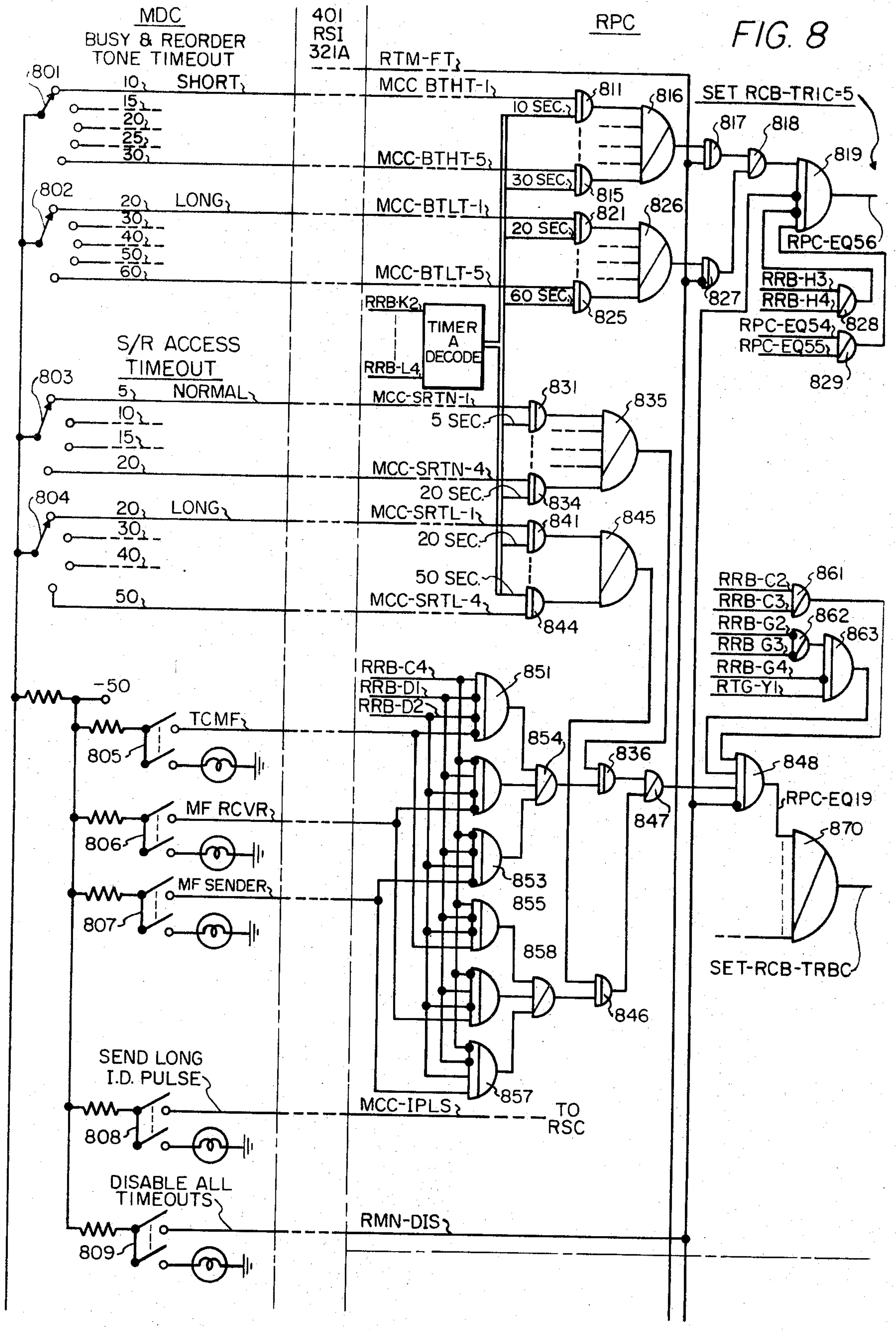
FIGS. 8 and 9 with FIG. 8 placed above FIG. 9 comprise a functional block diagram of part of the register-sender central control controlling timing circuits, and of a portion of the maintenance and control center.
Figure 9:
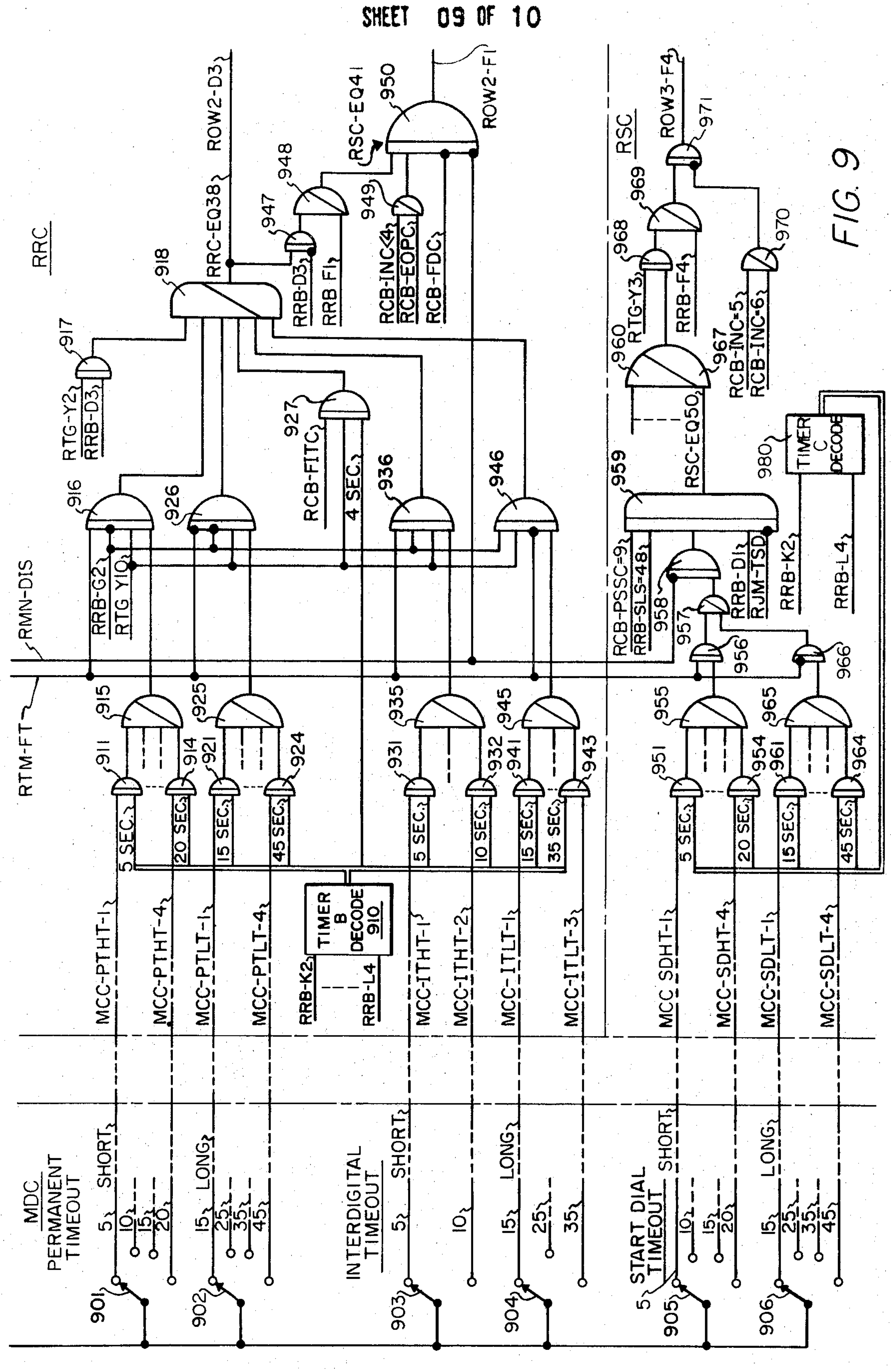

Decoding circuits for the outputs of the timers are provided throughout the logic circuits of the three controllers as required, but in FIGS. 8 and 9 are shown as single blocks for convenience with outputs to the various logic circuits and the time indicated thereon.

The processing sequence states are stored in bits G1–4 of Row 1. There are sixteen decoded values of the sequence state designated PSS=0 through PSS=15. For purposes of the present invention the significant state is PSS=0 for an idle, register junctor, all other states being a busy condition of one type or another.

Other fields of the memory will be described below with respect to the description of FIG. 1 and FIGS. 8 and 9.

SYMBOLISM FOR GATES AND BISTABLE DEVICES

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the out-put of each connected to an input of the other, which makes the circuit a bistable device. The logic also uses bistable devices in the form of JK flip-flops implemented with integrated circuits.

TRAFFIC MONITOR

FIG. 1 is a functional block diagram of a traffic monitor for the register junctors. The traffic monitor is a part of the RSI unit of the RMM frame. It interfaces with manual switches and lamps in the maintenance and control center MDC. These frames are interconnected via cable terminated on special interface circuits comprising chokes and constant current circuits which minimize noise signal coupling between the frames.

The traffic monitor comprises two counters 101 and 102 arranged to count in binary coded decimal format, for incoming and local register junctors respectively.

Busy register junctors are counted by noting the processing sequence state PSS which is stored in position G of row 1 for each register junctor. An idle register junctor is in the sequence state PSS=0, that is, the four bits G1, G2, G3 and G4 are all 0. During the time slot of a register junctor in sub-time slot Y1 this condition appears in the register read buffer latches RRB–G1 through G4. The outputs from these latches are connected as inputs of OR gate 120 in FIG. 1, so that the output of this gate is 0 when the register junctor is idle. The type of register junctor is indicated by bit C1 in row 1, being 1 for an incoming register junctor and 0 for a local register junctor. This signal condition is also read from the register read buffer latch RRB–C1 and appears as an enable input at AND gate 121 and an inhibit input at AND gate 122. These two gates are enabled by the register timing generator signals RTG–Y1 and RTG–X3, at which time for a busy incoming register junctor the signal is applied to counter 101 to advance it and for a busy local register junctor a signal is supplied from gate 122 to advance counter 102.

In the maintenance and control center MDC thumb wheel switches 153–156 are used to select the cut-in and cut-out levels for incoming and local register junctors to obtain fast timing rather than normal long timing for timing out register junctors when too much time is used before or during dialing. There are four sets of three thumb wheel switches each for hundreds, tens and units digits. Negative 50 volt-potential from the office battery is connected via a fuse and resistor to supply input voltage to the switches; and the outputs are in binary coded decimal form. The hundreds switch in each set is connected so that its output is either 0 or 1, while the tens and units switches of each set have four outputs for the binary coded value of digits 0 through 9. Thus each set of switches has nine output leads which are connected via cable and interface circuits to comparators in unit RSI.

The traffic monitor includes four exclusive-OR comparators 103–106. Each of these comparators has a set of inputs from one of the sets of thumb wheel switches, and also a set of inputs from the outputs of one of the traffic monitor counters. Thus the outputs of the incoming RJ busy counter 101 are connected to comparators 103 and 104, and the outputs of the local RJ busy counter 102 are connected to comparators 105 and 106. The outputs of the sets of thumb wheel switches 153 and 154 are connected respectively to comparators 103 and 104 for determining the cut-in level and cut-out level respectively for incoming register junctors; and the outputs of the sets of thumb wheel switches 155 and 156 are connected to comparators 105 and 106 to determine the cut-in level and cut-out level respectively for local register junctors. Each of the comparators comprises nine exclusive-OR gate arrangements with the outputs thereof inverted and channeled through an OR gate arrangement so that when each of the nine signals from the set of thumb wheel switches is the same as the corresponding nine signals respectively from the counter, then the output of the comparator is true. For example if the set of thumb wheel switches 153 is set at the value 0 8 4, then when the counter 101 is at the value 0 8 4 the signal CIL-I from comparator 103 is true, and this output signal sets a latch 113. In like manner the signal COL-I from comparator 104 when true sets a latch 114, the signal CIL-L from comparator 105 when true sets a latch 115, and the signal COL-L from comparator 106 when true sets a latch 116.

There are a total of 202 time slots designated Z0 through Z201, of which 192 are assigned to register junctors so that during time slots Z0 through Z191 the counters 101 and 102 may be advanced. During time slot Z201 in sub-time slot Y10, AND gate 124 has its output true to enable the four AND gates 133–136 to transfer the outputs of latches 113-116 into two latches 111 and 112 for incoming and local register junctors respectively. The outputs of the latches 113 and 115 for the cut-in levels enable AND gates 133 and 135 to set latches 111 and 112 respectively; while the outputs of latches 114 and 116 inhibit gates 134 and 136 so that if they are in the reset condition they will reset latches 111 and 112 respectively.

Normally the number of busy register junctors in each category will be less than the value set on the thumb wheel switches for both the cut-in and cut-out levels, in which case the latches 113–116 all remain in the reset condition up to time slot Z201, so that signals from gates 134 and 136 reset the latches 111 and 112 respectively. If the number of busy junctors in either category exceeds the value set for the cut-in level, then the corresponding latches will become set during time slot 201 to obtain fast timing in the next cycle. For example, if for the settings shown there are more than 64 incoming register junctors busy then both latches 113 and 114 will be set, so that the output of gate 133 is true and the output of gate 134 is false, so that latch 111 is set. During subtime slot Y11 of time slot Z201 the output of AND gate 123 is true to reset the two counters 101 and 102 and the four latches 113–116. The counters are then ready to count the number of busy register junctors in the next cycle.

As an example of the initiation and removal of fast timing, assume that the number of busy local register junctors is less than 60, so that latches 113, 114 and 111 all remain reset each cycle. Then if the number busy increases to 61, latch 114 becomes set and the signal via gates 124 and 134 merely causes latch 111 to remain reset. When in a subsequent cycle the number busy increases to say 65, latches 113 and 114 set, which at the end of the cycle causes latch 111 to set via gates 124 and 133 and initiates fast timing. As long as the number busy remains 64 or more each cycle, latches 113 and 114 are set and latch 111 remains set. When the number of busy drops to a value of 60 or more, but less than 64, latch 114 is set but not 113, so that there is no signal to the inputs of latch 111 and it remains set. Therefore fast timing continues for local register junctors. Eventually the number busy becomes less than 60, so that latches 113 and 114 both remain reset, and the signal via gates 124 and 134 resets latch 114. Fast timing is therefore no longer in effect for the local register junctors.

The maintenance and control center MDC has switches 151 and 152 for effectively inhibiting the fast timing function for incoming and local register junctors respectively. If switch 151 is closed it lights a lamp ILTO, and supplies a signal via the cable and interface circuits and lead MCC-IRJ-LT to inhibit gate 131; and likewise switch 152 for local register junctors when closed lights a lamp LLTO and supplies the signal via the cable and interface circuits and lead MCC-LRJ-LT to inhibit gate 132. Although normally these switches 151 and 152 are open so that the output of latch 111 is transferred to the output of gate 131, and the output of latch 112 is transferred to the output of gate 132. The output of gate 131 indicating fast timing for incoming register junctors is connected as an input of gate 141 and also via lead RTM-FT-INC and the cable and interface circuits to light a lamp IFT at the control center, and the output of gate 132 indicating fast timing for local register junctors is connected as an input of gate 142 and also via lead RTM-FT-LOC to light a lamp LFT at the control center.

During each time slot the fast timing signal is supplied via a cable to the register-sender central control circuits, to both of the duplicated units RCC-A and RCC-B. During sub-time slot Y1 of each time slot, for incoming register junctors the signal on lead RRB–C1 is true to enable gate 141 so that the fast timing signal from latch 111 via gate 131 appears at its output; and for local register junctors the signal on lead RRB–C1 is false to enable gate 142 so that the fast timing signal from latch 112 via gate 132 appears at its output. AND gate 144 has its output true during coincidences of the register timing generators X2 and Y1 to enable gates 145 and 146, so that if the fast timing signal is true latch 110 is set, and otherwise it is reset. The output of latch 110 is supplied via gate 146 to lead RTM-FT. This latter gate is inhibited if the signal from the register priority and interrupt circuits RPI has the signal RPI-RUN SIMPLEX SELECTED true. The signal on RTM-FT is supplied via a driver to cable 321A, and also via another driver to a corresponding cable to unit RCC-B.

TIMING IN THE REGISTER-SENDER CENTRAL CONTROL CIRCUITS

FIGS. 8 and 9 show a portion of each of the process controller RPC, register controller RRC and sender controller RSC of FIG. 5, with those circuits relating to the timing control particularly for fast or slow time out being shown. FIGS. 8 and 9 also show a portion of the maintenance and control console MDC. Various switches and lamps in the maintenance and control console MDC are connected via special interface circuits and cable 401 to the unit RSI shown in FIG. 4, the interface circuits at each end of the cable comprising special chokes and other circuits to provide for constant current on the cable conductors and to prevent noise coupling between the units. These circuits are then connected within the unit RSI to cable drivers to supply the signals via conductors of the cable 321A to the register central control circuit RCC to cable receivers therein for supply to the various logic circuits.

The operational description of Section L of the REGISTER-SENDER patent application and the flow charts related thereto show various conditions under which time-out of a register may occur and a time-out or other trouble indication recorded for use by the data processing unit DPU.

Figure 10:
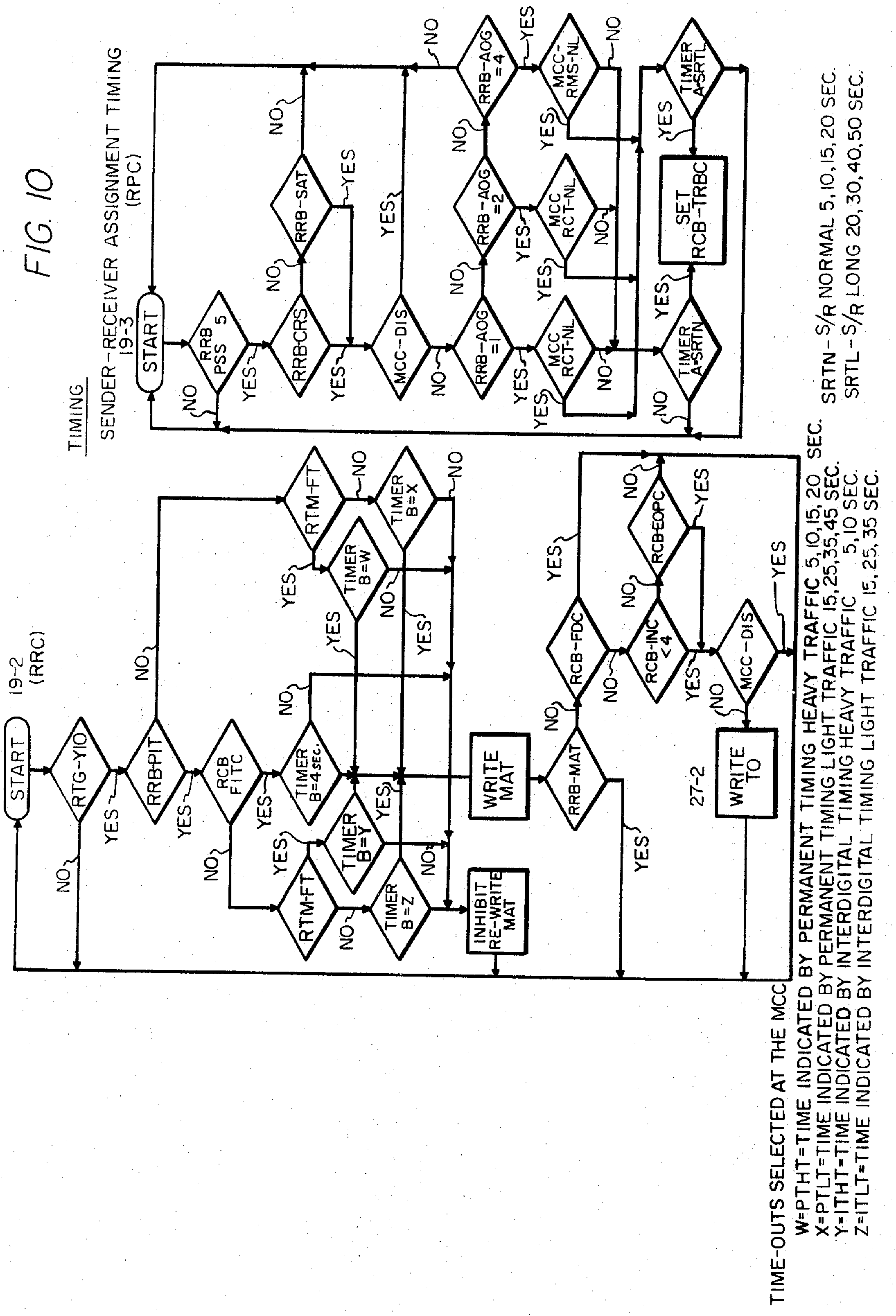
FIG. 10 comprises flow charts showing some of the timing operations.

Permanent and interdigital time-outs are controlled by the register controller RRC as shown by the logic in FIG. 9 and a flow chart in FIG. 10. A "permanent" is a condition in which a calling line has seized a register but has failed to dial, which may be caused by a short on the line or a telephone off-hook, as well as by a subscriber being slow in initiating dialing. The time-outs are indicated by a one bit control field TO in bit position F1 of word 2. This one bit field, along with other fields, are used to indicate the cause of a translation interrupt. The TO bit is set by the register-sender, and is one of the three fields that are transferred to the data processing unit DPU via the translation interrupt word.

The field MAT (match) in bit position D3 of word 2 is used to indicate when the decoded value from timer B matches the switch setting for permanent and interdigital time-outs in the maintenance control center MDC. When the timer value is no longer equal to the switch setting the field MAT is reset. When the field MAT is set and the data processing unit DPU clears the TO bit the TO bit will not be set again.

In the maintenance and control center the amount of time allowed before a permanent time-out for periods of heavy traffic is determined by the setting of switch 901, and for periods of light traffic is determined by the setting of switch 902. As shown switch 901 may select values of 5, 10, 15 or 20 seconds for short timing, and switch 902 may select values of 15, 25, 35 or 45 seconds for long timing. The four leads from switch 901 are connected via leads MCC-PTHT–1 through 4 to gates 911 through 914, and corresponding outputs decoded from timer B are connected as other input to these four gates. The outputs of the gates are connected to an OR-gate 915 whose true output indicates a match between the timer B and the setting of switch 901. Similarly the outputs from switch 902 are connected via the four leads MCC-PTLT–1 through 4 to gates 921 through 924 which likewise has inputs from timer B, and an OR-gate 925 indicates a match between the setting of switch 902 and timer B output.

Interdigital time-outs are set by switch 903 to select either 5 or 10 seconds for a short time out in heavy traffic, and switch 904 selects either 15, 25 or 35 seconds for long time-out during light traffic. The outputs of switch 903 are connected via leads MCC-ITHT-1 and 2 to gates 931 and 932; and the outputs of switch 904 are connected via the three leads MCC-ITLT-1 through 3, to the gates 941 through 943. These gates likewise have inputs from the decoded output of timer B, and the outputs of the gates are connected to OR-gates 935 and 945, with the true output from gate 935 indicating a match between timer B and the setting of switch 903, while a true output from 945 indicates a match between the setting of switch 904 and timer B.

Field PIT in bit position G2 of word 2 is used by the register-sender to indicate that at least one digit has been received (or lost) and to perform interdigital timing rather than permanent timing. The output for the PIT field is shown on FIG. 9 as the read buffer output RRB–G2. The match condition for permanent and interdigital time-out is monitored by the register controller logic during sub-time slot Y10 which is one of the two sub-time slots associated with row 2, the signal being indicated as the register timing generator output RTG–Y10. This is one of the signal inputs to the four gates 916, 926, 936 and 946. The PIT condition appearing on lead RRB–G2 is used to inhibit gates 916 and 926 and to enable gates 936 and 946. The fast timing signal from the traffic monitor in FIG. 1, supplied via lead RTM-FT is used as an enabling input for gates 916 and 936 and as an inhibit input to gates 926 and 946. Each of these four gates also has an input or match indication from gates 915, 925, 935 and 945 respectively. The outputs of the four gates are connected as inputs of OR-gate 918.

There is also an interdigital timing control via gate 927, for fast interdigital timing under certain circumstances. One example would be the situation in which the digit 0 is used for both calling an operator and as the initial digit in certain operator-assisted subscriber dialed calls. In this case a fast time-out is used to route the call to an operator if the subscriber does not dial additional digits. A field FIT in bit position K4 of word 4 will be set in these situations. When this field is true its output during sub-time slot Y4 sets a carry buffer latch FITC, and the output lead RCB-FITC is connected as an input to gate 927. The other inputs are from lead RTG-Y10 and the four-second output of timer B. The output of this gate is also an input to OR-gate 918. The output of gate 918 represents the register controller equation 38. This output is connected via lead ROW2–D3 and the write transfer circuit RWT of FIG. 5 to control writing field MAT into memory. The field is rewritten in the next cycle during sub-time slot Y2 under the control of gate 917 via gate 918.

The output of gate 918 is also used to set the TO field in memory if certain other conditions are met. The instruction from the data processing unit which occurs in the field IN in bit positions A1-4 of row 1 must have a value of less than 4, unless the early outpulsing field EOP in bit position B1 of row 1 is true. Once dialing has been finished as indicated by the FD field in bit position B2 of row 1 permanent and interdigital time-out should be inhibited. These fields are used to selectively set carry buffer latches during subtime slot Y1. There are four instruction carry buffer latches INC, and the decoded output for an instruction less than four appears on lead RCB-INC<4 as an input of OR-gate 949. The out-put of the early outpulsing carry buffer latch EOPC appears on lead RCB-EOPC as another input of OR-gate 949. The output of this gate is one of the inputs of AND gate 950. The output of the finished dialing carry buffer latch FDC on lead RCB-FDC is used an an inhibit input of gate 950. The switch 809 (FIG. 8) at the maintenance and control center MDC for "disabled all time-outs" is supplied via lead RMN-DIS, and is an inhibit input of gate 950. Thus if the instruction from the data processor has a value of less than four or early outpulsing is indicated, and finished dialing has not occurred, and the disable all time-outs switch has not been closed, then the output from gate 918 which sets the field MAT is also supplied via gates 947, 948 and 950 to set the TO field via lead ROW2-F1. In succeeding cycles the condition will continue to be rewritten using the read buffer output RRB-F1 via gates 458 and 950. However, if the data processing unit resets the TO field after taking action, and the latch condition from gate 918 for writing the field MAT is still true, the writing of the TO field will be inhibited via the signal lead RRB-D3 at gate 947.

The flow chart in FIG. 10 shows the operation for permanent and interdigital time-outs.

The busy and reorder tone time-out control circuits are shown at the top of FIG. 8. In the maintenance and control center MDC, switch 801 selects a time of 10, 15, 20, 25 or 30 seconds for short time-out during heavy traffic; and switch 802 selects 20, 30, 40, 50 or 60 second long time-outs for the periods of light traffic. The setting of the switches is matched with the output of the timer A decode in the process controller RPC at gates 811–815 and 821–825, with a match for heavy traffic appearing at the output of gate 816 and a match for light traffic appearing at the output of gate 826. The signal on lead RTM-FT enables the match for heavy traffic at gate 817 when true and for light traffic at gate 827 when false. These time-out circuits are effective when the command is being supplied to actuate the busy or reorder tone connections in the register junctor. Referring to the REGISTER-SENDER patent application, this is accomplished with the RPC equations 54 or 55 for busy or reorder tone respectively. When the signal condition for either one of these equations is true it via OR gate 829 enables gate 819. The output of gate 819 which is RPC equation 56, is used to set carry buffer latches TRIC to a value of 5 to initiate a translation interrupt and indicate the cause as being a time-out on line busy or reorder tone application. Gate 819 is inhibited if there is already a request for translation or waiting for a translation as indicated by the fields H4 and H3 in row 1, the output from these fields being effective via OR gate 828 to inhibit gate 819. Gate 819 is also inhibited when the disable all time-outs signal on lead RMN-DIS is true.

The operation for busy and reorder tone time-out is shown on flow chart of FIG. 37 of the REGISTER-SENDER patent application.

The start dial time-out control circuits in the sender controller RSC are shown at the bottom of FIG. 9. Short timing is controlled by switch 905 in the maintenance and control center MDC to select periods of 5, 10, 15 or 20 seconds for heavy traffic; and long timing is selected by switch 906 for 15, 25, 35 or 45 seconds for light traffic. The outputs of these switches are matched with the timer C decoded output at gates 951–954 and 961–964 with the match for heavy traffic appearing at the output of gate 955 and the output for light traffic appearing at the output of gate 965. The signal on lead RTM-FT enables gate 956 to pass the heavy traffic match condition, and when false enables gate 966 to pass the light traffic match condition. The output of these gates is supplied via gates 957 and 958 as an input to gate 959, and may be inhibited at gate 958 by the disable all time-outs signal on lead RMN-DIS. This time-out operation is used during sending to time arrival of "wink" and start dialing before sending, to remove "delay dialing" signals between digits, and while waiting for change to off-hook signal (ANI - Start identification) is received from a different office before sending the calling number. The instruction from the data processing unit to wait for the off-hook signal is indicated by setting the EOH field in bit position D1 from word 3, the output from this field on lead RRB-D1 being used as an input of gate 959. At this time the processing sequence state indicated in the carry buffer latches PSSC has a value of 9, and the sending sequence state from the field D2–E3 in row 3 has a value of 48 indicated on the lead RRB-SLS=48.

The output from gate 959 is one of several possible conditions at the inputs of OR gate 960 for setting the TSN field in bit position F4 of word 3. This is a trouble in sending operation indicator. It is written in memory during sub-time slot Y3 via gates 968, 969 and 971, and then recirculated in subsequent time slots in response to the signal on lead RRB-F4 via gates 969 and 971. This signal condition may be inhibited by the data processing unit instruction having values of 5 or 6, indicated by the carry buffer output signals via gate 970 to inhibit gate 971. These are retrial instructions which cause the terminating path to be dropped and new connections attempted.

The operation for the start dial time-out is shown in the flow charts of FIGS. 30 and 33 of the REGISTER-SENDER patent application.

Sender and receiver access time out control circuits are shown in FIG. 8, and the operation is shown in the flow chart of FIG. 10. The selection of a time for normal timing is via switch 803 of the maintenance and control center MDC, and via switch 804 for long timing. The leads from these switches are matched with the output of timer A at gates 831–834 and 841–844 with the matched condition appearing at the output of gates 835 or 845. The selection of normal or fast timing is accomplished using the switches 805, 806 and 807 for the TCMF receivers, multifrequency receivers or multifrequency senders respectively; rather than using the signal on lead on RTM-FT from the traffic monitor. The type of receiver or sender being selected is indicated by the AOG field in row 1, with bit C4 indicating a TCMF receiver, bit D1 indicating an MF receiver, and bit D2 indicating an MF sender. The read buffer signals for these bits in combination with the outputs of the switches 805, 806 and 807 via gates 851–858 selects the appropriate timing for the type of receiver or sender, and for normal or long timing. The signals from these gates along with the match signals from gate 835 or 845 are supplied via the gate 836, 846 and 847 as an input to gate 848. The output of this gate represents the process controller equation RPC-EQ 19. The conditions in this equation include the processing sequence state being less than or equal to 5 as indicated by the values of the read buffer signals from fields G2, G3 and G4 at gates 862 and 863. Also one of the fields SAT or CRS in bits C2 and C3 must be true indicating that sender or receiver assignment is being attempted, and one of these fields' output signals via gate 861 is used to enable gate 848. The signal on lead RPC-EQ 19 is one of several possible conditions for setting the system trouble carry buffer latch TRBC via OR gate 870.

What is claimed is:

1. In a data processing system having a plurality of peripheral units for connection to lines to receive data signals;

processing and storage apparatus comprising a memory and logic circuits shared on a time division multiplex basis, said memory having sets of storage elements, a plurality of registers individually associated with said peripheral units each register comprising a block with a given number of said sets including at least one process control set which includes a process-sequence-state store for storing sequence state information, a source of cyclically recurring pulses supplied to the memory, a multiplex arrangement associating each register with an individual pulse time slot during which the information in the corresponding memory block is read via read circuits into a read buffer, selectively modified by means of the logic circuits, and written back into the block via write circuits, so that during a portion of the time slot for a register the information including that from its process control set, appears in the read buffer, data signal information being received by logic circuits from the peripheral units during the associated time slots for storage in the memory;

a traffic monitor comprising counting means, a settable device in which a predetermined number is set, and comparison means having inputs connected to the counting means and to the settable device to compare the signals therefrom representing the numbers stored therein to produce an output when the numbers are equal;

means coupling the input of the counting means to outputs of the read buffer corresponding to said process-sequence-state store to advance the counting means during each time slot in response to a given status condition indication, a bistable device connected to the output of said comparison means to be set in response to the output signal therefrom so that the set state of the bistable device indicates that the counting means have been advanced to a number equal to or exceeding said predetermined number, and means to reset the counting means and the bistable device once each cycle;

whereby the set state of the bistable device indicates that the number of registers and associated peripheral units having the given status condition each cycle equals or exceeds the predetermined number.

2. In a data processing system, the combination as claimed in claim 1, wherein said settable device comprises manual switch means for setting the predetermined number;

and wherein said given status indication is the busy condition of a peripheral unit.

3. In a data processing system, the combination as claimed in claim 2, wherein there are two of said settable devices comprising manual switch means for setting separate predetermined numbers for cut-in level and cut-out level respectively, and wherein there are two of said comparison means for cut-in level and cut-out level respectively, the comparison means for cut-in level having inputs from the settable device for the cut-in level and from the counting means, and the comparison means for cut-out level having inputs from the settable device for the cut-out level and the same counting means, and wherein there are two of said bistable devices connected respectively to indicate the outputs of the two comparison means, wherein with the predetermined number for the cut-in level greater than the predetermined number for the cut-out level, if the number of peripheral units busy during a cycle is equal to or greater than the predetermined number for the cut-in level then both of the bistable devices are set, if the number of peripheral units busy during the cycle is less than the predetermined number for the cut-out level neither bistable device is set, and if the number of busy peripheral units is equal to or greater than the predetermined number for the cut-out level and less than the predetermined number for the cut-in level then the bistable device indicating the cut-out level only is set during the cycle, both of the bistable devices being reset once each cycle along with the counting means.

4. In a data processing system, the combination as claimed in claim 3, further including a common bistable device, gate means coupling the outputs of the cut-in level and cut-out level indicating bistable devices respectively to set and reset inputs of the common bistable device, means effective once each cycle before the reset of the cut-in level and cut-out level bistable devices and counting means, and effective after the counting of all of the busy peripheral units to enable said gating means to set the common bistable device in response to the cut-in level indicating bistable device being set, and to reset the common bistable device in response to the cut-out level indicating bistable device being in the reset condition, the common bistable device remaining in its previous state if the cut-in level indicating bistable device is in the reset condition and the cut-out level indicating bistable device is in the set condition.

5. In a data processing system, the combination as claimed in claim 4, wherein there are two categories of said peripheral units, with the register for each peripheral unit including a category-indication store (C1 of Row 1);

wherein said traffic monitor, for each category of peripheral units, includes apparatus having its own said counting means, its own said comparison means, two of said settable devices, and cut-in level and cut-out level indicating bistable devices, and its own said common bistable device, whereby the common bistable device for each category may be controlled in accordance with its own cut-in level and cut-out level values;

and wherein there is further a control bistable device (110), wherein the output of the read buffer corresponding to said category-indicating store controls the input to the counting means to advance the counting means in accordance with the status condition indication for the corresponding category of peripheral units, and wherein the category-indication from the read buffer also controls said control bistable device to be selectively set if the common bistable device for that category of peripheral units has been set each cycle.

6. In a data processing system which is part of a communication switching system, the combination as claimed in claim 5, wherein said peripheral units are register junctors for connection to communication lines for receiving digital call information.

7. In a data processing system, the combination as claimed in claim 6, further including means responsive to the output of said control bistable device to provide a normal time-out of certain operations for conditions of light traffic as indicated by the control bistable device being in a reset condition, and to provide relatively fast time-out for said operations in response to the control bistable device being in a set condition.

8. In a data processing system, the combination as claimed in claim 7, further including manual switches for selecting the specific time-out values for conditions of heavy and light traffic for different ones of said selected operations, and wherein there is provided match comparison circuits for comparing the setting of the switches and the output of timing means, and wherein the setting of said control bistable device selects which outputs of the switches and timing means are compared, so that normal or fast time-out may be selected.

* * * * *

UNITED STATES PATENT OFFICE

CERTIFICATE OF CORRECTION

Patent No. 3,760,105 Dated Sept. 18, 1973

Inventor(s) SERGIO E. PUCCINI

It is certified that error appears in the above-identified patent and that said Letters Patent are hereby corrected as shown below:

Column 2, line 23 after "1971" insert -- , now patent No. 3,737,873 issued June 5, 1973,--

Signed and sealed this 23rd day of April 1974.

(SEAL)
Attest:

EDWARD M.FLETCHER,JR.
Attesting Officer

C. MARSHALL DANN
Commissioner of Patents